US012568321B2

(12) United States Patent
Liu

(10) Patent No.: US 12,568,321 B2
(45) Date of Patent: *Mar. 3, 2026

(54) TIME DELAY INTEGRATION SENSOR WITH PIXELS HAVING DIFFERENT SENSING ABILITY

(71) Applicant: PIXART IMAGING INC., Hsin-Chu County (TW)

(72) Inventor: Ren-Chieh Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 293 days.

This patent is subject to a terminal disclaimer.

(21) Appl. No.: 18/350,905

(22) Filed: Jul. 12, 2023

(65) Prior Publication Data

US 2023/0353902 A1 Nov. 2, 2023

Related U.S. Application Data

(63) Continuation-in-part of application No. 17/711,079, filed on Apr. 1, 2022, now Pat. No. 11,863,885, which is a continuation-in-part of application No. 17/351,235, filed on Jun. 18, 2021, now Pat. No. 11,336,843.

(30) Foreign Application Priority Data

Jun. 30, 2020 (TW) .................................. 109122077
Mar. 31, 2021 (TW) .................................. 110111970

(51) Int. Cl.
*H04N 25/768* (2023.01)

(52) U.S. Cl.
CPC .................................. *H04N 25/768* (2023.01)

(58) Field of Classification Search
CPC ............. H04N 5/3532; H04N 5/37452; H04N 5/37455; H04N 5/3743; H04N 5/378
USPC ......................................................... 348/296
See application file for complete search history.

(56) References Cited

U.S. PATENT DOCUMENTS

| | | | |
|---|---|---|---|
| 5,909,026 A | 6/1999 | Zhou et al. | |
| 7,268,814 B1 | 9/2007 | Pain et al. | |
| 10,488,181 B2 | 11/2019 | Wang | |
| 2008/0079830 A1 | 4/2008 | Lepage | |
| 2009/0128672 A1* | 5/2009 | Watanabe .............. | G02B 5/201 348/273 |
| 2011/0279725 A1 | 11/2011 | Cazaux et al. | |

(Continued)

*Primary Examiner* — Lin Ye
*Assistant Examiner* — Chan T Nguyen
(74) *Attorney, Agent, or Firm* — HAUPTMAN HAM, LLP

(57) ABSTRACT

The present disclosure provides a time delay integration (TDI) sensor using a rolling shutter. The TDI sensor includes multiple pixel columns. Each pixel column includes multiple pixels arranged in an along-track direction, wherein two adjacent pixels or two adjacent pixel groups in every pixel column have a separation space therebetween. The separation space is equal to a pixel height multiplied by a time ratio of a line time difference of the rolling shutter and a frame period, or equal to a summation of at least one pixel height and a multiplication of the pixel height by the time ratio of the line time difference and the frame period. The TDI sensor generates image frames using pixels having different sensing ability for a processor to perform image combination.

16 Claims, 13 Drawing Sheets

(56) References Cited

U.S. PATENT DOCUMENTS

2014/0085518 A1* 3/2014 Fox ...................... H04N 25/768
                                                 348/E5.091
2018/0098014 A1* 4/2018 Zuleta ................. H10F 39/8053
2019/0132541 A1* 5/2019 Borremans ............ H04N 25/46

* cited by examiner second pixels                    first pixels 121
122
123
124
12_1

12_2 second pixels                    first pixels 121
122
123
124
12_1

12_2

TIME DELAY INTEGRATION SENSOR WITH PIXELS HAVING DIFFERENT SENSING ABILITY

CROSS REFERENCE TO RELATED APPLICATION

This application is a continuation-in-part application of U.S. patent application Ser. No. 17/711,079 filed on, Apr. 1, 2022, which is a continuation-in-part application of U.S. patent application Ser. No. 17/351,235 filed on, Jun. 18, 2021, which claims the priority benefit of Taiwan Patent Application Serial Number 109122077, filed on Jun. 30, 2020, and Taiwan Patent Application Serial Number 110111970, filed on Mar. 31, 2021, and the full disclosures of which are incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a time delay integration (TDI) sensor and, more particularly, to a TDI Complementary Metal-Oxide-Semiconductor (CMOS) image sensor that implements the rolling shutter operation by spatial compensation.

2. Description of the Related Art

The time delay integration (TDI) sensor uses an area array image sensor to capture images from an imaging platform that is moving relative to the imaged object or scene at a constant speed. The TDI sensor is conceptually considered as the stack of linear arrays, wherein each linear array moves across a same point of the scene at a time period that the image sensor moves a distance of one pixel.

Conventionally, the charge-coupled device (CCD) technology has been used for TDI applications because CCDs intrinsically operate by shifting charge from pixel to pixel across the image sensor to allow charges between pixels to integrate when the image sensor moves across a same point of the imaged scene. However, CCD technology is relatively expensive to fabricate and CCD imaging devices consume relatively high power.

Although using a CMOS circuit can achieve lower power, higher degree of integration and higher speed, the existing designs suffer from higher noises. Although a 4-transistor (4T) structure can be used to minimize noises, the 4T pixels are clocked using a rolling shutter technique. Using the rolling shutter clocking can cause artifacts in the captured image since not all pixels are integrated over the same time period.

Therefore, U.S. Pat. No. 9,148,601 provides a CMOS image sensor for TDI imaging. Please refer to FIG. 1, the CMOS image sensor includes multiple pixel columns 112, and each pixel column is arranged to be parallel to an along-track direction $D_{a\_t}$. For compensating the integration interval of the rolling shutter of the CMOS image sensor, a physical offset 150 is further arranged between two adjacent pixels of each pixel column 112, wherein if the pixel column 112 has N rows, each physical offset 150 is equal to a pixel height divided by N.

Accordingly, the present disclosure further provides a TDI CMOS image sensor that implements the rolling shutter operation by spatial compensation.

SUMMARY

The present disclosure provides a TDI CMOS image sensor with a separation space determined according to the pixel height, the line time difference of a rolling shutter and the frame period.

The present disclosure further provides a TDI CMOS image sensor that changes the line time difference corresponding to different conditions with a fixed separation space.

The present disclosure further provides a TDI CMOS image sensor that arranges two separately operated pixel arrays in an along-track direction to increase a number of times of integrating pixel data corresponding to the same position of a scene.

The present disclosure provides a TDI CMOS image sensor that captures an image frame using a rolling shutter and moves with respect to a scene in an along-track direction. The image sensor includes a pixel array, multiple first integrators and multiple second integrators. The pixel array has multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple first pixels and multiple second pixels, and the multiple first pixels are exposed by a first exposure time and the multiple second pixels are exposed by a second exposure time, different from the first exposure time. The multiple first integrators respectively integrate pixel data of the multiple first pixels. The multiple second integrators respectively integrate pixel data of the multiple second pixels.

The present disclosure provides a TDI CMOS image sensor that captures an image frame using a rolling shutter and moves with respect to a scene in an along-track direction. The image sensor includes a pixel array, multiple first integrators and multiple second integrators. The pixel array has multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple first pixels and multiple second pixels, and the multiple first pixels have a first quantum efficiency and the multiple second pixels have a second quantum efficiency, different from the first quantum efficiency. The multiple first integrators respectively integrate pixel data of the multiple first pixels. The multiple second integrators respectively integrate pixel data of the multiple second pixels.

The present disclosure provides a TDI CMOS image sensor that captures an image frame using a rolling shutter and moves with respect to a scene in an along-track direction. The image sensor includes a pixel array, multiple first integrators and multiple second integrators. The pixel array has multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple first pixels and multiple second pixels, the multiple first pixels are exposed by a first exposure time and have a first quantum efficiency, and the multiple second pixels are exposed by a second exposure time, different from the first exposure time and have a second quantum efficiency, different from the first quantum efficiency. The multiple first integrators respectively integrate pixel data of the multiple first pixels. The multiple second integrators respectively integrate pixel data of the multiple second pixels.

In the present disclosure, the separation space is not directly related to a size of the pixel array (i.e. a number of pixels), and the separation space can be determined once the frame period and the line time difference are determined.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The CMOS image sensor of the present disclosure compensates a line time difference in time delay integration (TDI) imaging using a rolling shutter by arranging a separation space between pixels in an along-track direction. Accordingly, pixel data corresponding to the same position of an imaged scene is integrated in successive image frames so as to increase the signal-to-noise ratio (SNR), wherein a number of integration is related to a size of pixel array.

The concept of TDI imaging is known to the art, and the present disclosure is to eliminate the imaging distortion generated in a TDI CMOS image sensor using rolling shutter technique.

Figure 2:
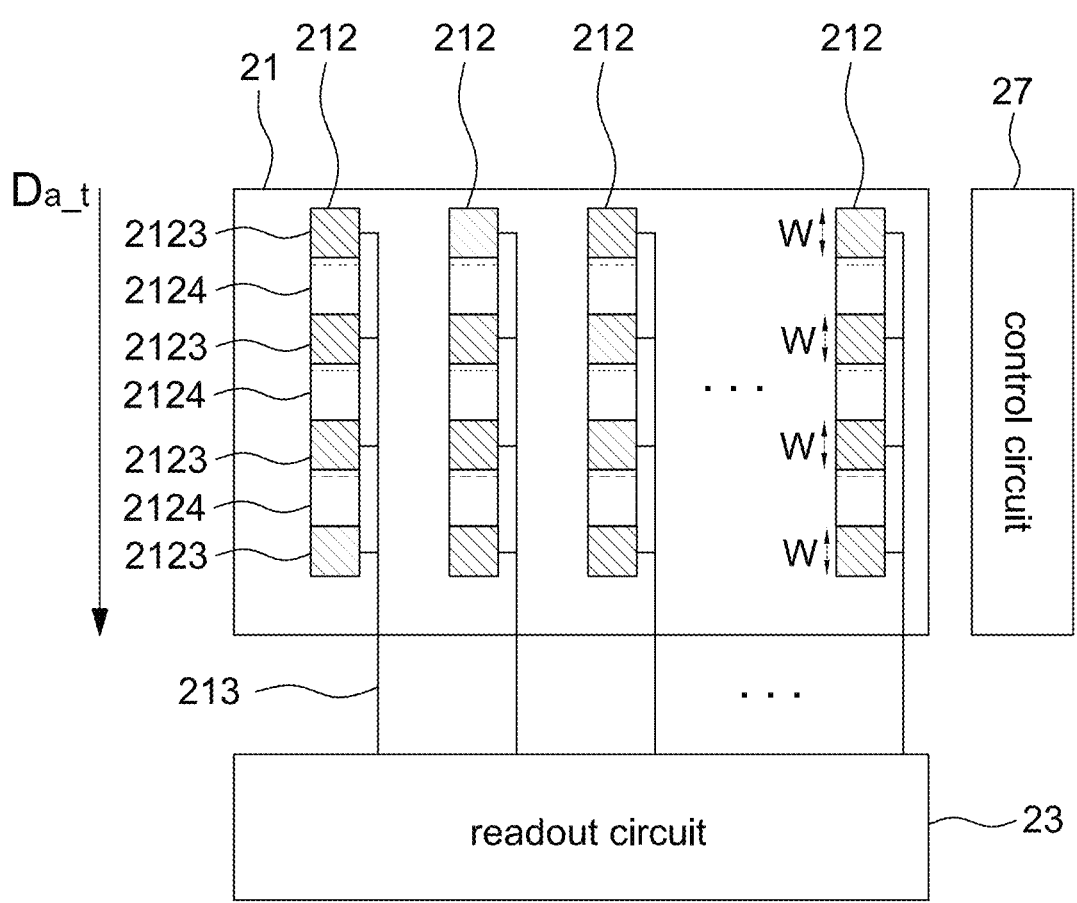
FIG. 2 is a schematic diagram of a TDI CMOS image sensor according to a first embodiment of the present disclosure.

Please refer to FIG. 2, it is a schematic diagram of a TDI CMOS image sensor 200 according to a first embodiment of the present disclosure. The TDI CMOS image sensor 200 captures image frames using a rolling shutter, and moves toward an along-track direction $D_{a\_t}$ with respect to a scene, wherein the scene is determined according to an application of the TDI CMOS image sensor 200. For example, when the TDI CMOS image sensor 200 is applied to a scanner, the scene is a scanned document; whereas, when the TDI CMOS image sensor 200 is applied to a satellite or aircraft, the scene is a ground surface.

The operation of the rolling shutter is known to the art, and thus details thereof are not described herein.

The TDI CMOS image sensor 200 includes a pixel array 21. The pixel array 21 includes multiple pixel columns 212. Each of the pixel columns 212 includes multiple pixels 2123 (e.g., shown as regions filled with slant lines herein) arranged in the along-track direction $D_{a\_t}$ (e.g., shown as a longitudinal direction of the pixel array 21). Two adjacent pixels of each pixel column 212 have a separation space 2124 (e.g., shown as blank regions herein) therebetween.

Figure 3:
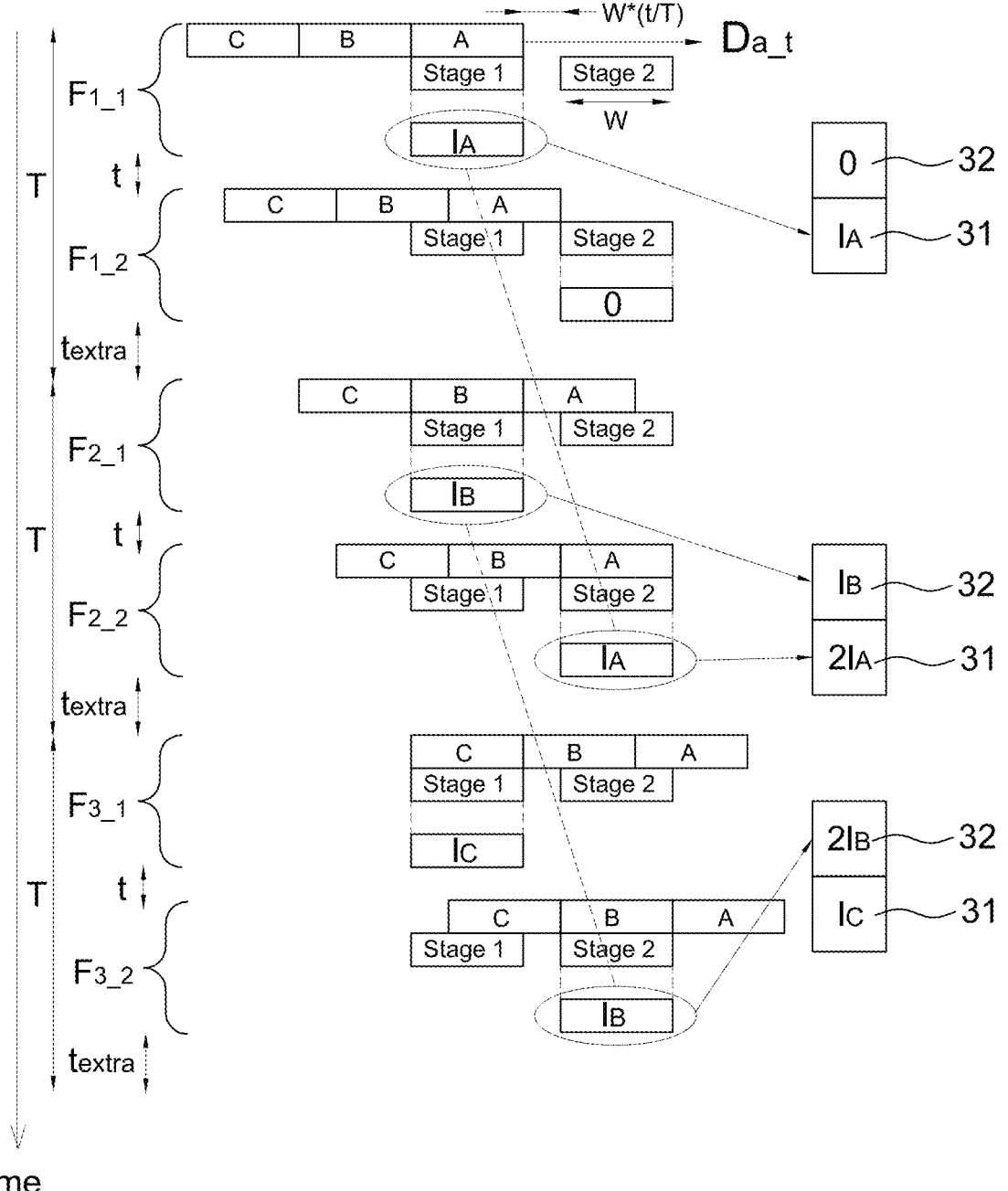
FIG. 3 is an operational schematic diagram of the TDI CMOS image sensor of FIG. 2.

Please refer to FIG. 3, it is an operational schematic diagram of the TDI CMOS image sensor 200 of FIG. 2. In one aspect, the separation space 2124 is equal to a multiplication of a pixel height W of one pixel 2123 in the along-track direction $D_{a\_t}$ by a time ratio of a line time difference t of the rolling shutter and a frame period T of capturing the image frame (e.g., FIG. 3 showing three image frames), i.e. separation space=W×t/T.

In the present disclosure, the line time difference t is a time interval between a time of starting or ending exposure of two adjacent pixel rows.

In FIG. 3, it is assumed that the scene includes 3 positions or objects A, B and C moving rightward (i.e. along-track direction $D_{a\_t}$). Stage1 and Stage2 indicate two pixel rows of each pixel column 212, wherein the separation space W×t/T is arranged between Stage1 and Stage2. In the present disclosure, the frame period T is determined according to brightness of the scene and a sensitivity of the pixel array 21. A moving speed of the TDI CMOS image sensor 200 is set as the pixel height W divided by the frame period T.

Because FIG. 3 assumes that the pixel column 212 of the pixel array 21 has two pixel rows, the frame period T, in which the TDI CMOS image sensor 200 captures one image frame, includes two line times, which have a line time difference t. Herein, a line time is referred to a processing time interval for accomplishing the exposing and reading of one pixel row. For example, FIG. 3 shows that a first image frame includes two pixel rows $F_{1\_1}$ and $F_{1\_2}$; a second image frame includes two pixel rows $F_{2\_1}$ and $F_{2\_2}$; and a third image frame includes two pixel rows $F_{3\_1}$ and $F_{3\_2}$.

In this embodiment, the TDI CMOS image sensor 200 further includes multiple integrators, e.g., FIG. 3 showing two integrators 31 and 32, wherein the integrators are, for example, a buffer (i.e. digital integrator) or a capacitor (i.e. analog integrator), and a number of the integrators are preferably corresponding to a number of pixel columns 212 so as to determine a width of the imaged scene. The integrators 31 and 32 are respectively used to integrate pixel data in adjacent image frames corresponding to a same position or object of the scene.

For example, in the first image frame (e.g., including $F_{1\_1}$ and $F_{1\_2}$), Stage1 senses pixel data of the position or object A of the scene, and integrates (or adds) to the integrator 31, e.g., shown as $I_A$; now, the integrator 32 does not yet integrate (or store) any pixel data, e.g., shown as 0.

As the scene moves in the along-track direction $D_{a\_t}$ at a speed W/T, in the second image frame (e.g., including $F_{2\_1}$ and $F_{2\_2}$), Stage1 senses pixel data of the position or object B of the scene, and integrates (or adds) to the integrator 32, e.g., shown as $I_B$; and Stage2 senses pixel data of the position or object A of the scene, and integrates (or adds) to the integrator 31, e.g., shown as $2I_A$ (indicating integrated by two times).

As the scene continuously moves in the along-track direction $D_{a\_t}$ at the speed W/T, in the third image frame (e.g., including $F_{3\_1}$ and $F_{3\_2}$), the pixel data $2I_A$ associated with the object A already integrated in the integrator 31 is read out at first. Next, Stage1 senses pixel data of the position or object C of the scene, and integrates (or adds) to the integrator 31, e.g., shown as $I_C$; and Stage2 senses pixel data of the position or object B of the scene, and integrates (or adds) to the integrator 32, e.g., shown as $2I_B$ (indicating integrated by two times). When the scene is continuously imaged, the TDI CMOS image sensor 200 continuously integrates and reads pixel data using the process as shown in FIG. 3 to improve the SNR of the captured image frame.

In one aspect, the frame period T (i.e. exposure interval of one image frame) is larger than a summation of row exposure times for capturing all pixel rows of the pixel array 21 using the rolling shutter, e.g., FIG. 3 showing that an extra time $t_{extra}$ is left after a second pixel row of every image frame is exposed and read.

In one non-liming aspect, within a time difference (i.e. $t_{extra}$) between the frame period T and the summation of row exposure times, the image sensor 200 enters a sleep mode to save power.

In one non-liming aspect, a column analog-to-digital converter (ADC) (e.g., included in the readout circuit 23) of the TDI CMOS image sensor 200 performs, within the time difference $t_{extra}$, the analog-digital (AD) conversion on pixel signals of auxiliary pixels (e.g., dark pixels), external voltages or temperatures of an external temperature sensor of the pixel array 21. More specifically, within the time difference $t_{extra}$, the column ADC is used to perform the AD conversion on sensing signals outside the pixel columns 212 so as to broaden applications of the TDI CMOS image sensor 200. In this aspect, a line time is preferably set as the minimum time required for processing one row of pixel data.

In this embodiment, the readout circuit 23 samples every pixel using, e.g., correlation double sampling (CDS).

Please refer to FIG. 2 again, in another aspect, the separation space 2124 is equal to a summation of a pixel height W in the along-track direction $D_{a\_t}$ and a multiplication of the pixel height W by a time ratio of a line time difference t of the rolling shutter and a frame period T of capturing the image frame, i.e. separation space=W×(y+t/T).

Figure 4A:
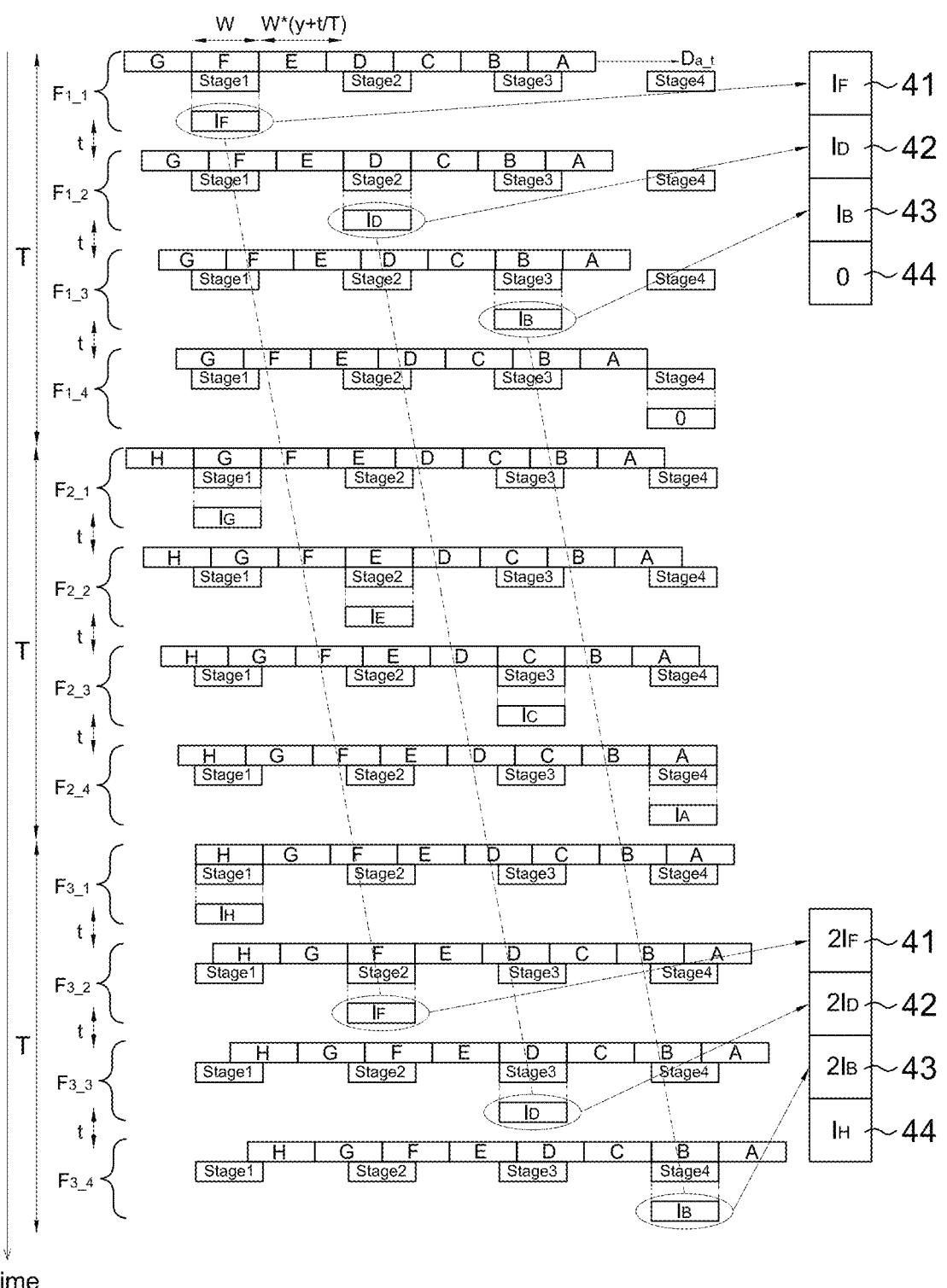
FIG. 4A is another operational schematic diagram of the TDI CMOS image sensor of FIG. 2.

Please refer to FIG. 4A together, it is another operational schematic diagram of the TDI CMOS image sensor 200 of FIG. 2. In FIG. 4A, it is assumed that one scene includes eight positions or objects A to H, and moves rightward (i.e. along-track direction $D_{a\_t}$). Stage1 to Stage 4 indicate four pixel rows of one pixel column 212, wherein the separation space W×(y+t/T) is arranged between two adjacent pixels, wherein y=0 or a positive integer. FIG. 4A shows an aspect that y=1; and an aspect of y=0 is shown in FIG. 3.

Because FIG. 4A assumes that the pixel array 21 includes four pixel rows, thus the frame period T of the TDI CMOS image sensor 200 for capturing one image frame includes four line times, which have a line time difference t from each other. For example, FIG. 4A shows that one image frame includes four pixel rows $F_{1\_1}$ to $F_{1\_4}$; a next image frame includes four pixel rows $F_{2\_1}$ to $F_{2\_4}$; and a further next image frame includes four pixel rows $F_{3\_1}$ to $F_{3\_4}$; and so on.

Similarly, the TDI CMOS image sensor 200 further includes multiple integrators, e.g., FIG. 4A showing four integrators 41 to 44. The integrator 41 is used to integrate pixel data in a first image frame (e.g., frame including $F_{1\_1}$ to $F_{1\_4}$) and a second image frame (e.g., frame including $F_{3\_1}$ to $F_{3\_4}$) corresponding to the same position (e.g., position or object F) of the scene, wherein the first image frame and the second image frame is separated by one image frame (e.g., frame including $F_{2\_1}$ to $F_{2\_4}$). The operations of other integrators 42 to 44 are identical to that of the integrator 41, and the difference is in integrating the pixel data at different positions or objects.

It is seen from FIG. 4A that a first pixel (e.g., Stage1) in the first image frame for sensing pixel data (e.g., $I_F$) of the same position (e.g., F) and a second pixel (e.g., Stage2) in the second image frame for sensing pixel data (e.g., $I_F$) of the same position (e.g., F) are two adjacent pixels of the same pixel column 212 in the pixel array 21. Therefore, the integrators (e.g., 41 to 44) do not integrate the pixel data $I_F$ in the first pixel and the second pixel corresponding to the same position within a frame period of the one image frame between the first image frame and the second image frame. The sensing and integration of positions or objects D and B are shown by dashed lines and arrows in FIG. 4A.

In the aspect of FIG. 4A, because the integrators 41 to 44 integrate pixel data in the image frames separated by one image frame (e.g., frame including $F_{2\_1}$ to $F_{2\_4}$) corresponding to the same position or the same object of a scene, if it is assumed that the pixel columns 212 have N pixels, the integrators 41 to 44 integrate N/2 times of pixel data corresponding to the same position or the same object of the scene.

The pixel data of the image frame $F_{2\_1}$ to $F_{2\_4}$ is integrated in another group of integrators, wherein the pixel data of the same position or the same object of the scene is also integrated by skipping one image frame (e.g., frame including $F_{3\_1}$ to $F_{3\_4}$).

When y=n, a same position of the scene is sensed by a next adjacent pixel of the same pixel column 212 after n image frames. Once the control signal outputted by the control circuit 27 is properly arranged, the pixel data of the same position or object of the scene is accurately integrated in the same integrator.

Figure 4B:
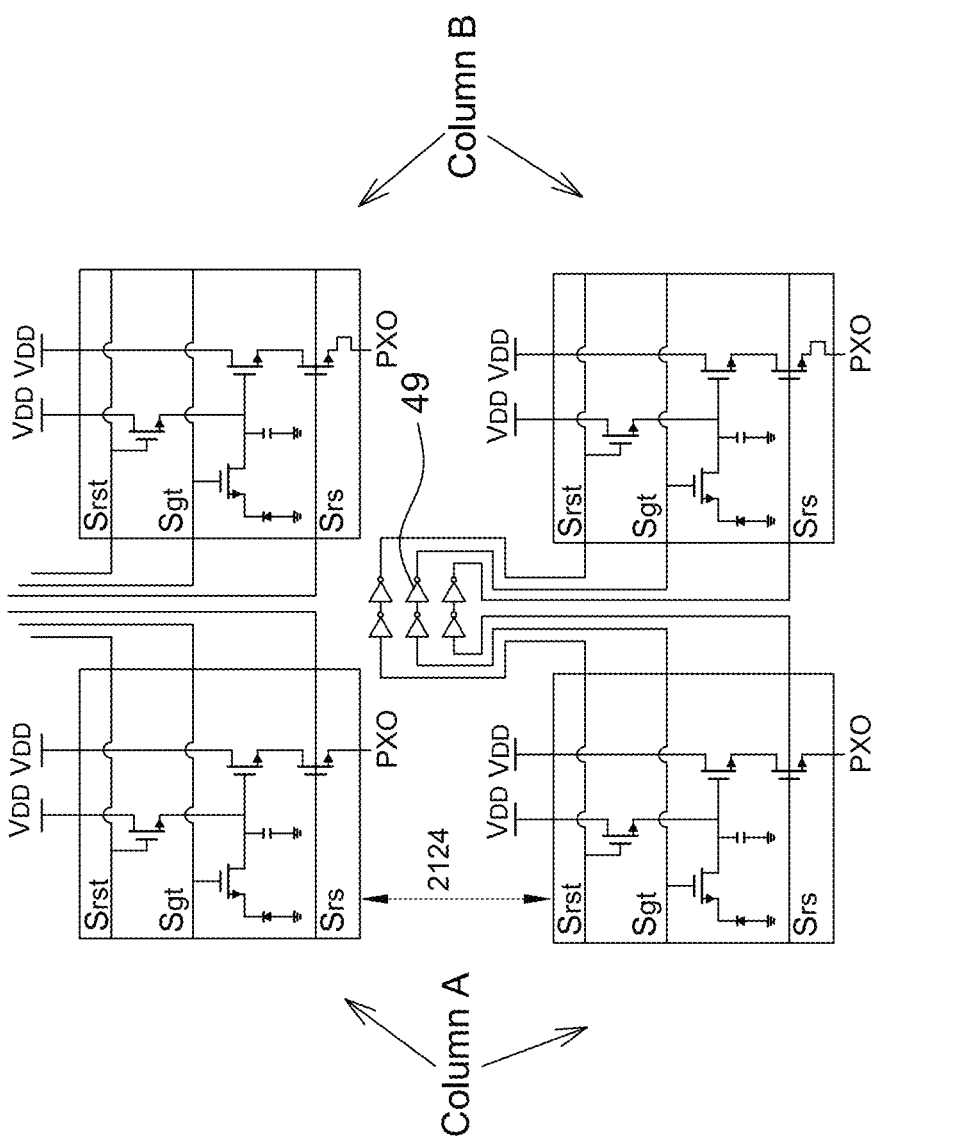
FIG. 4B is a schematic diagram of arranging buffers within the separation space of the TDI CMOS image sensor of FIG. 2.

In addition, in the aspect of FIG. 4A, because adjacent pixels of the pixel columns 212 have a larger separation space 2124, in the case that a wider imaged scene image is required, it is possible to arrange buffers in the separation space 2124 every predetermined number of pixel columns to buffer or amplify control signals of the pixel row. For example as shown in FIG. 4B, in the separation space 2124, the buffers 49 are arranged to buffer or amplify pixel control signals, e.g., including the reset signal Srst, signal transfer signal Sgt and row selection signal Srs, but not limited to. In this way, even a pixel array having a large number of pixel columns can still operate accurately.

Figure 5:
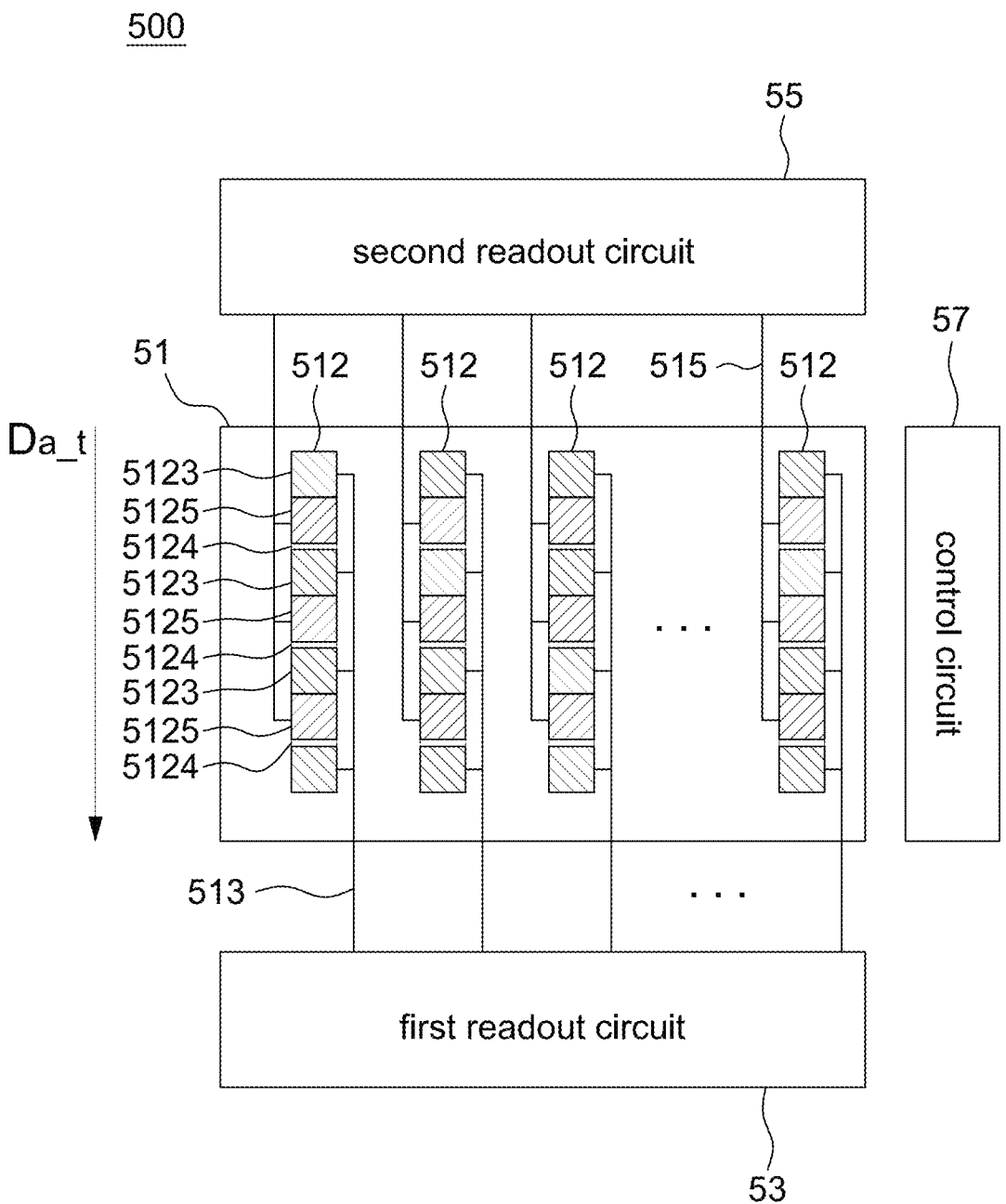
FIG. 5 is a schematic diagram of a TDI CMOS image sensor according to a second embodiment of the present disclosure.

Please refer to FIG. 5, it is a schematic diagram of a TDI CMOS image sensor 500 according to a second embodiment of the present disclosure. The TDI CMOS image sensor 500 is also captures an image frame using a rolling shutter, and moves toward an along-track direction $D_{a\_t}$ with respect to a scene.

The TDI CMOS image sensor 500 includes a pixel array 51. The pixel array 51 includes multiple pixel columns 512 each including multiple pixels arranged in the along-track direction $D_{a\_t}$. A separation space 5124 is arranged between two adjacent pixel groups to compensate a line time difference in using the rolling shutter, wherein each pixel group includes a first pixel 5123 and a second pixel 5215 directly connected to each other, i.e. no separation space 5124 therebetween.

The TDI CMOS image sensor 500 further includes a first readout circuit 53 and a second readout circuit 55. As shown in FIG. 5, the first readout circuit 53 is coupled to multiple first pixels 5123 in the pixel columns 512 via a readout line 513 so as to read pixel data of the first pixels 5123, and the second readout circuit 55 is coupled to multiple second pixels 5125 in the pixel columns 512 via a readout line 515 so as to read pixel data of the second pixels 5125.

Figure 6:
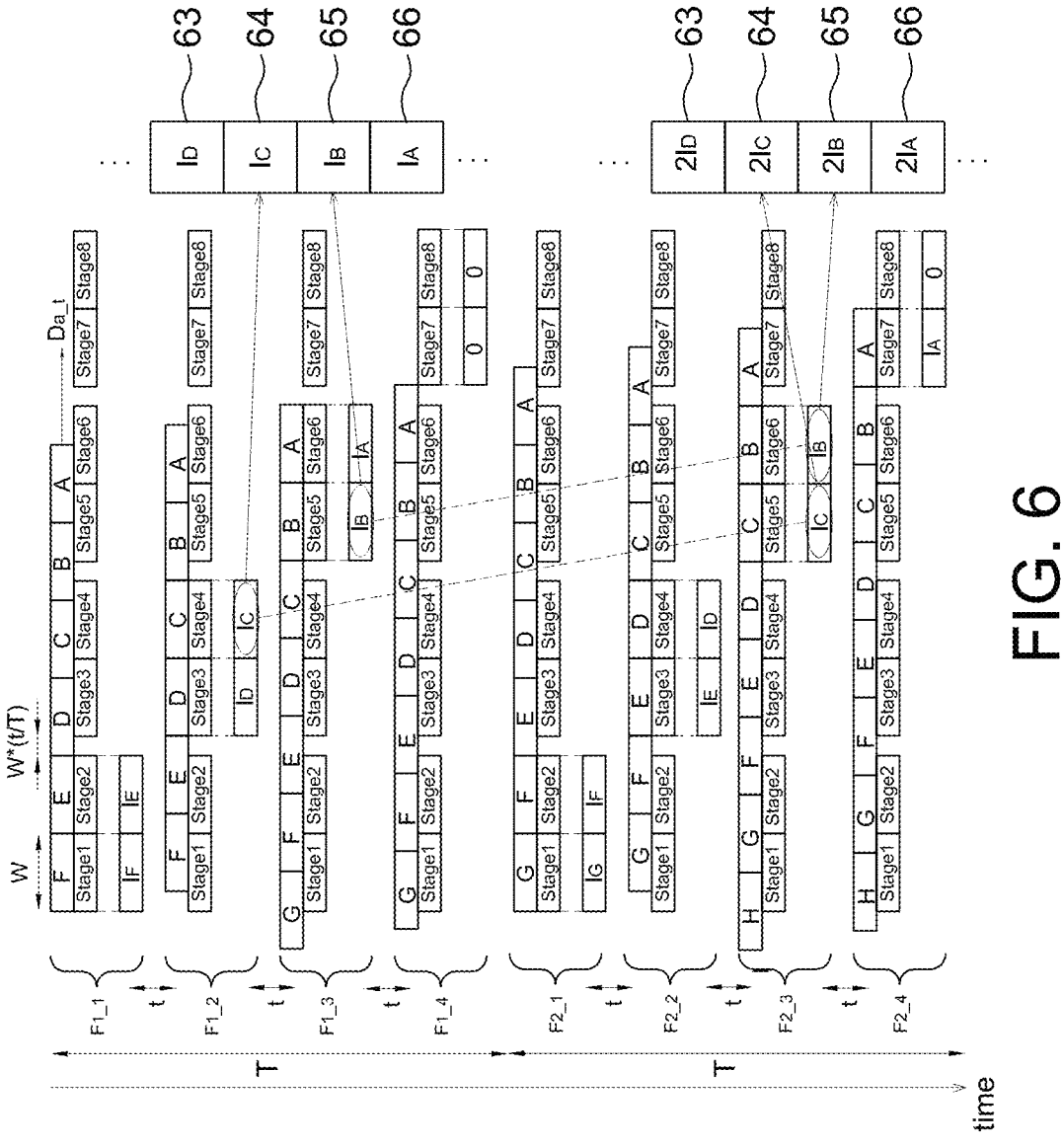
FIG. 6 is an operational schematic diagram of the TDI CMOS image sensor of FIG. 5.

Please refer to FIG. 6, it shows an operational schematic diagram of the TDI CMOS image sensor 500 in FIG. 5. In one aspect, the separation space 5124 is a multiplication of a pixel height W in the along-track direction $D_{a\_t}$ by a time ratio of a line time difference t of the rolling shutter and a frame period T of capturing the image frame (e.g., FIG. 6 showing two image frames), i.e. separation space=W×t/T.

In FIG. 6, it is assumed that a scene includes eight positions or objects A to H, and moves rightward (i.e. along-track direction $D_{a\_t}$).

In this embodiment, the readout circuits 53 and 55 uses, e.g., CDS to sample every pixel. In FIG. 6, Stage1 and Stage2, Stage3 and Stage 4, Stage5 and Stage 6, Stage7 and Stage 8 respectively indicate one pixel group of one pixel column 512, wherein Stage1, Stage3, Stage5 and Stage7 are first pixels 5123, and Stage2, Stage4, Stage6 and Stage8 are second pixels 5125. The separation space W×t/T is arranged between two adjacent pixel groups.

Because it is assumed that the pixel array 51 in FIG. 6 has four pixel groups in the along-track direction $D_{a\_t}$, a frame period T that the TDI CMOS image sensor 500 captures one image frame includes 4 line times, which have a line time difference t between each other. For example, FIG. 6 shows that a first image frame includes four rows of pixel groups $F_{1\_1}$ to $F_{1\_4}$; and a second image frame includes four rows of pixel groups $F_{2\_1}$ to $F_{2\_4}$.

In this embodiment, the first pixel 5123 and the second pixel 5125 of each pixel group are exposed simultaneously, and the pixel data thereof is respectively integrated by the first readout circuit 53 and the second readout circuit 55 simultaneously.

For example, in the line time of $F_{1\_2}$ of a first image frame (e.g., frame including $F_{1\_1}$ to $F_{1\_4}$), Stage3 and Stage4 are exposed at the same time, and pixel data of Stage3 (e.g., $I_D$) is integrated by the first readout circuit 53 to the integrator 63, and pixel data of Stage4 (e.g., $I_C$) is integrated by the second readout circuit 55 to the integrator 64. In the line time of $F_{1\_3}$ of the first image frame, Stage5 and Stage6 are exposed at the same time, and pixel data of Stage5 (e.g., $I_B$) is integrated by the first readout circuit 53 to the integrator 65, and pixel data of Stage6 (e.g., $I_A$) is integrated by the second readout circuit 55 to the integrator 66. The exposure and integration of other line times in a frame period T of the first image frame are similar to the line times $F_{1\_2}$ and $F_{1\_3}$.

For example, in the line time of $F_{2\_3}$ of a second image frame (e.g., frame including $F_{2\_1}$ to $F_{2\_4}$), Stage5 and Stage6 are exposed at the same time, and pixel data of Stage5 (e.g., $I_C$) is integrated by the first readout circuit 53 to the integrator 64, shown as $2I_C$ indicating integrated by two times; and pixel data of Stage6 (e.g., $I_B$) is integrated by the second readout circuit 55 to the integrator 65, shown as $2I_B$ indicating integrated by two times. The exposure and integration of other line times in a frame period T of the second image frame are similar to the line times $F_{2\_3}$.

For example, the first readout circuit 53 and the second readout circuit 55 are respectively coupled to each integrator via a switching device (e.g., a multiplexer, but not limited thereto). The switching device is controlled by a control signal (e.g., generated by the control circuit 57) to integrate pixel data read by the first readout circuit 53 or the second readout circuit 55 to the same integrator. It is appreciated that FIG. 6 shows only a part of integrators for describing the present disclosure.

More specifically, multiple integrators of the TDI CMOS image sensor 500 respectively store pixel data in the first image frame (e.g., frame including $F_{1\_1}$ to $F_{1\_4}$) and the second image frame (e.g., frame including $F_{2\_1}$ to $F_{2\_4}$), adjacent to each other, corresponding to the same position (e.g., B) of a scene, wherein in the first image frame, pixel data (e.g. $I_B$) corresponding to a same position (e.g., B) of the scene is read by the first readout circuit 53 and integrated to an integrator 65; and in the second image frame, the pixel data (e.g. $I_B$) corresponding to the same position (e.g., B) of the scene is read by the second readout circuit 55 and integrated to the integrator 65. As long as the output signal of the control circuit 57 is corresponding arranged, the pixel data read from different readout circuits is correctly integrated in the same integrator. The method of integrating pixel data of associated pixels by other integrators is similar to the descriptions in this paragraph, and thus is not repeated herein.

In other aspects, the above embodiments of FIG. 2 and FIG. 5 are combinable. For example, a separation space between two adjacent pixel groups is a summation of a pixel height W and a multiplication of the pixel height W by a time ratio of a line time difference t of the rolling shutter and a frame period T of capturing the image frame, i.e. separation space=W×(y+t/T).

As mentioned above, the TDI CMOS image sensor integrates pixel data for multiple times using integrators to increase the SNR. However, in order to allow both bright regions and dark regions in one image frame to be within a suitable gray level range so as to increase a dynamic range, one combination image is obtained by combining two image frames acquired by pixels having different sensing ability. The present disclosure further provides a TDI CMOS image sensor that integrates pixel data of two image frames acquired using two different quantum efficiency and/or exposure times.

Figure 11:
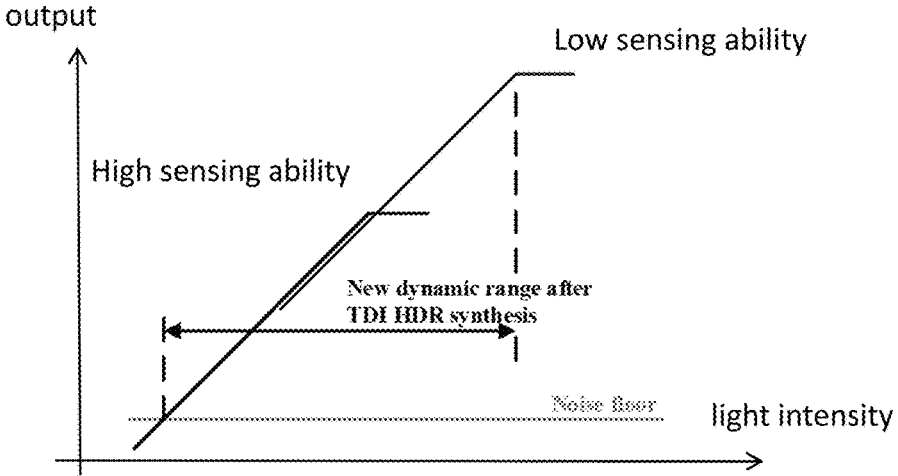
FIG. 11 is a schematic diagram of obtaining a high dynamic range using pixels having different sensing ability.

As shown in FIG. 11, pixels having high sensing ability are used to acquire light having lower intensity in order not to cause overexposure, and pixels having low sensing ability are used to acquire light having higher intensity in order not to cause underexposure. After synthesizing output signal, it is able to obtain a higher dynamic range than a dynamic range of each of the pixels having high sensing ability and having low sensing ability.

Figure 7:
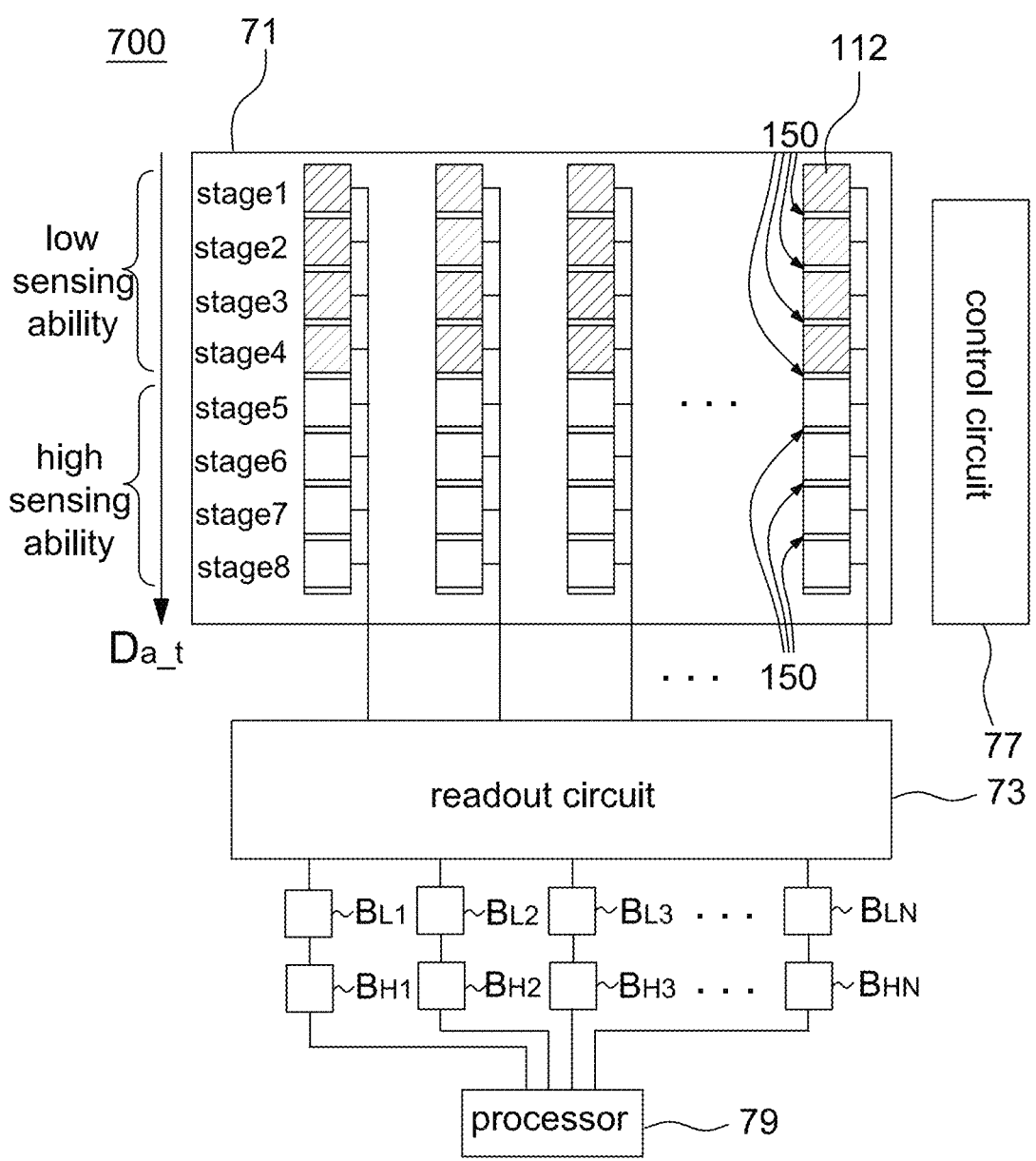
FIGS. 7 to 9 are schematic diagrams of a TDI CMOS image sensor according to a third embodiment of the present disclosure.

Please refer to FIG. 7, it is a schematic diagram of a TDI CMOS image sensor 700 according to a third embodiment of the present disclosure. The TDI CMOS image sensor 700 also captures an image frame using a rolling shutter and moves with respect to a scene in an along-track direction $D_{a\_t}$.

The TDI CMOS image sensor 700 includes a pixel array 71, a readout circuit 73, a control circuit 77, multiple first integrators $B_{L1}$-$B_{LN}$, multiple second integrators $B_{H1}$-$B_{HN}$ and a processor 79. The processor 79 is a digital signal processor (DSP), an application specific integrated circuit (ASIC) or a field programmable gate array (FPGA).

The pixel array 71 also includes multiple pixel columns 112. Each of the pixel columns 112 includes multiple pixels (e.g., stage1 to stage8) arranged in the along-track direction $D_{a\_r}$, and two adjacent pixels of each of the pixel columns 112 have a separation space 150 therebetween.

The control circuit 77 outputs control signals, e.g., including the row selection signal, reset signal and charge transfer signal, to cause the pixel array 71 to operate in rolling shutter, which is known to the art and thus details thereof are not described herein.

The readout circuit 73 reads gray level data of each pixel to be integrated in corresponding integrators $B_{L1}$~$B_{LN}$ or $B_{H1}$~$B_{HN}$, e.g., the multiple first integrators $B_{L1}$~$B_{LN}$ and the multiple second integrators $B_{H1}$~$B_{HN}$ corresponding to a same pixel column respectively integrating pixel data of a same position or object of a scene in adjacent image frames.

The difference between the embodiment in FIG. 7 and the above embodiments is that the multiple pixels of each of the pixel columns 112 of the pixel array 71 include identical numbers of multiple first pixels (e.g., stage1 to stage4) and multiple second pixels (e.g., stage5 to stage8). In this embodiment, the first pixels stage1 to stage4 have first sensing ability and the second pixels stage5 to stage 8 have second sensing ability, different from the first sensing ability.

The sensing ability of a pixel circuit determines intensity of output pixel data. Upon receiving identical light, if the sensing ability is larger, the intensity of output pixel data is larger; and if the sensing ability is smaller, the intensity of output pixel data is smaller.

In one aspect, the sensing ability is an exposure time. For example, the first pixels stage1 to stage4 are exposed by a first exposure time, and the second pixels stage5 to stage8 are exposed by a second exposure time, different from the first exposure time. In the case that the second exposure time is longer than the first exposure time, the second exposure time is arranged as the maximum exposure time that can be set, and the first exposure time is arranged to be smaller than, for example, a half of the second exposure time, but not limited to.

In another aspect, the sensing ability is quantum efficiency. For example, the first pixels stage1 to stage4 are arranged to have first quantum efficiency, and the second pixels stage5 to stage8 are arranged to have second quantum efficiency, different from the first quantum efficiency. Please refer to FIGS. 12A to 12C, they are schematic diagrams showing that the second quantum efficiency is larger than the first quantum efficiency. For example, each first pixels 12_1 and each second pixels 12_2 includes a photodiode 124 covered by a filter (e.g., color filter) 122 and at least one convex microlens 121, and a light shield layer 123 is used to define a fill factor of each of the first pixels 121 and second pixels 12_2. The material of the light shield layer 123 is not particularly limited as long as it can block light from impinging onto the photodiode 124.

Figure 12A:
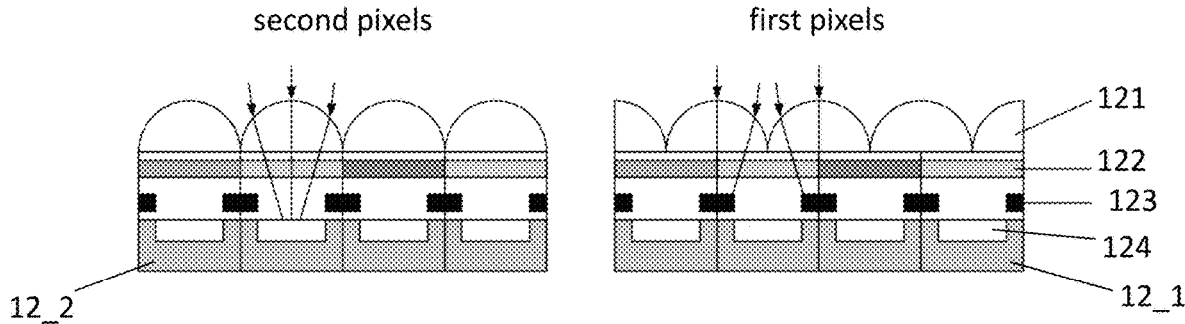
FIG. 12A-12C are schematic diagrams of pixels obtaining different quantum efficiency using different component arrangements.

As shown in FIG. 12A, each of the second pixels 12_2 is aligned with a center of the convex microlens 121, and each of the first pixels 12_1 is aligned with edges of two adjacent convex microlens 121 such that the second pixels 12_2 (i.e. stage5 to stage8) have a higher quantum efficiency than the first pixels 12_1 (i.e. stage1 to stage4).

In another aspect, each of the second pixels 12_2 is aligned with a center of the convex microlens 121, and each of the first pixels 12_1 is aligned with a center of a concave microlens such that the second pixels 12_2 have a higher quantum efficiency than the first pixels 12_1.

Figure 12B:
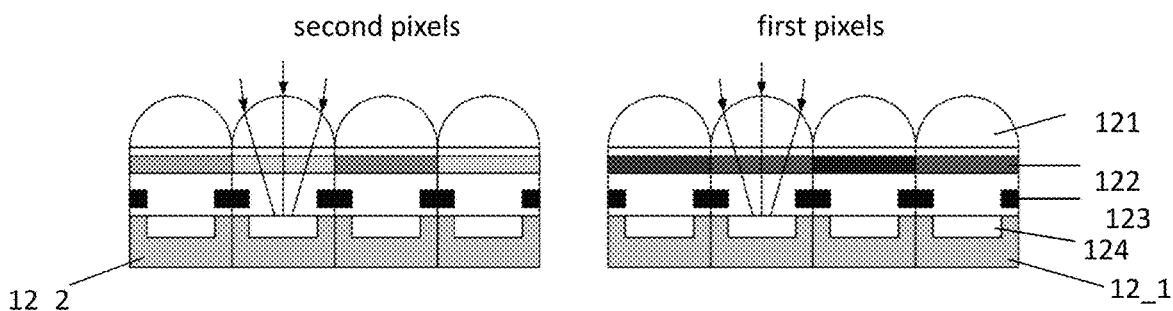

As shown in FIG. 12B, each of the second pixels 12_2 is covered by the filter 122 having a second transparency, and each of the first pixels 12_2 is covered by the filter 122 having a first transparency, which is lower than the second transparency such that the second pixels 12_2 have a higher quantum efficiency than the first pixels 12_1.

Figure 12C:
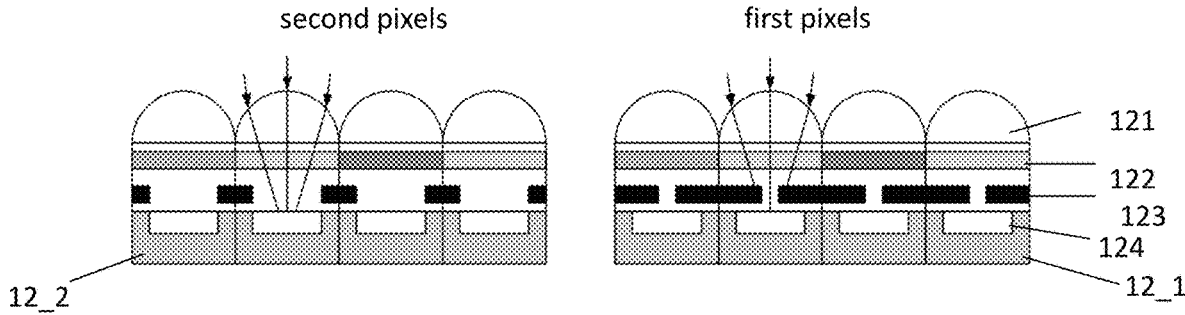

As shown in FIG. 12C, each of the second pixels 12_2 has a second fill factor, and each of the first pixels 12_2 has a first fill factor, which is smaller than the second fill factor such that the second pixels 12_2 have a higher quantum efficiency than the first pixels 12_1.

To define the quantum efficiency of the first pixels 12_1 and the second pixels 12_2, at least one arrangement of FIGS. 12A to 12C is selected.

As shown in FIG. 7, in one aspect, the first pixels stage1 to stage4 (shown by rectangles filled with slant lines) are all adjacent to one another, and the second pixels stage5 to stage8 (shown by blank rectangles) are all adjacent to one another. It should be mentioned that although FIG. 7 shows that the first pixels stage1 to stage4 have low sensing ability and the second pixels stage5 to stage8 have high sensing ability, it is only intended to illustrate but not to limit the present disclosure. In another aspect, the first pixels stage1 to stage4 have high sensing ability, and the second pixels stage5 to stage8 have low sensing ability.

In the third embodiment, the multiple first integrators $B_{L1}$-$B_{LN}$ are respectively coupled to the readout circuit 73, and each of the first integrators $B_{L1}$-$B_{LN}$ respectively integrates pixel data of the first pixels stage1 to stage4; and the multiple second integrators $B_{H1}$-$B_{HN}$ are respectively coupled to the readout circuit 73, and each of the second integrators $B_{H1}$-$B_{HN}$ respectively integrates pixel data of the second pixels stage5 to stage8, or vice versa.

For example in FIG. 7, the first integrator $B_{L1}$ corresponding to stage1 to stage4 of a first pixel column 112 integrates pixel data corresponding to a first position of a scene, and the second integrator $B_{H1}$ corresponding to stage5 to stage8 of the first pixel column 112 integrates pixel data corresponding to the first position of the scene. In FIG. 7, the first integrator $B_{L2}$ corresponding to stage1 to stage4 of a second pixel column 112 integrates pixel data corresponding to a second position of the scene, and the second integrator $B_{H2}$ corresponding to stage5 to stage8 of the second pixel column 112 integrates pixel data corresponding to the second position of the scene, and so on.

In the third embodiment, each of the first integrators $B_{L1}$-$B_{LN}$ and the second integrators $B_{H1}$-$B_{HN}$ integrates pixel data of a same position for four times. However, a number of times of integrating pixel data by the integrators $B_{L1}$-$B_{LN}$ and $B_{H1}$-$B_{HN}$ is determined according to a number of first pixels (or activated first pixels, i.e. not every first pixels being activated in operation) and a number of second pixels (or activated second pixels, i.e. not every second pixels being activated in operation) in the same column.

The processor 79 receives pixel data in the first integrators $B_{L1}$-$B_{LN}$ integrated within one frame period to form a first image frame, and receives pixel data in the second integrators $B_{H1}$-$B_{HN}$ integrated within another frame period to form a second image frame. The processor 79 then combines the first image frame and the second image frame to form a combination image. The method of generating a combination image using two image frames may be referred to U.S. patent application Ser. No. 14/731,713 assigned to the same assignee of the present application, and the full disclosure of which is incorporated herein by reference, but the present disclosure is not limited thereto.

In another aspect, the first pixels stage1 to stage 4 and the second pixels stage5 to stage8 have identical sensing ability, i.e. having identical exposure time and identical quantum efficiency. The processor 79 receives pixel data integrated in the first integrators $B_{L1}$-$B_{LN}$ associated with the first pixels stage1 to stage4, and receives pixel data integrated in the second integrators $B_{H1}$-$B_{HN}$ associated with the second pixels stage5 to stage8, and then amplifies the pixel data integrated in the first integrators $B_{L1}$-$B_{LN}$ with a first digital gain, and amplifies the pixel data integrated in the second integrators $B_{H1}$-$B_{HN}$ with a second digital gain different from (e.g., shown in FIG. 7 being larger than) the first digital gain. In this way, two image frames having different intensity are also generated.

In another aspect, the TDI CMOS image sensor 700 uses pixels having different sensing ability and different digital gains to generate a combination image.

Figure 8:
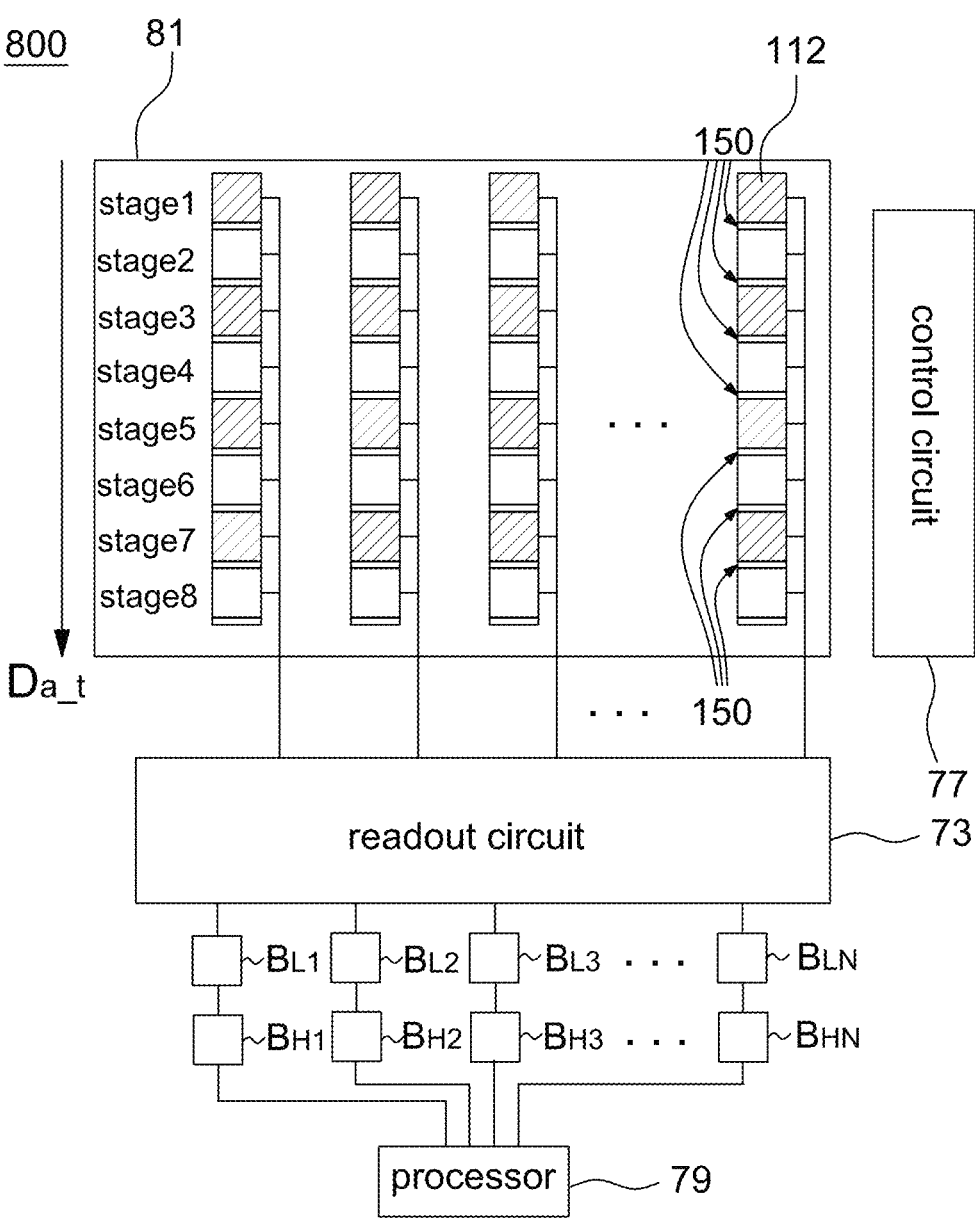

Please refer to FIG. 8, it is an alternative TDI CMOS image sensor 800 according to the third embodiment of the present disclosure. The difference between the TDI CMOS image sensors 800 and 700 is that the first pixels (e.g., stage1, stage3, stage5 and stage7) and the second pixels (e.g., stage2, stage4, stage6 and stage8) of the pixel array 81 are interlaced. Other parts of the TDI CMOS image sensor 800 are identical to the TDI CMOS image sensor 700, i.e. integrating pixel data of first pixels respectively using first integrators $B_{L1}$-$B_{LN}$, and integrating pixel data of second pixels respectively using second integrators $B_{H1}$-$B_{HN}$, or vice versa. And the processor 79 uses a first image frame generated by the first integrators $B_{L1}$-$B_{LN}$ and a second image frame generated by the second integrators $B_{H1}$-$B_{HN}$ to generate a combination image.

Figure 9:
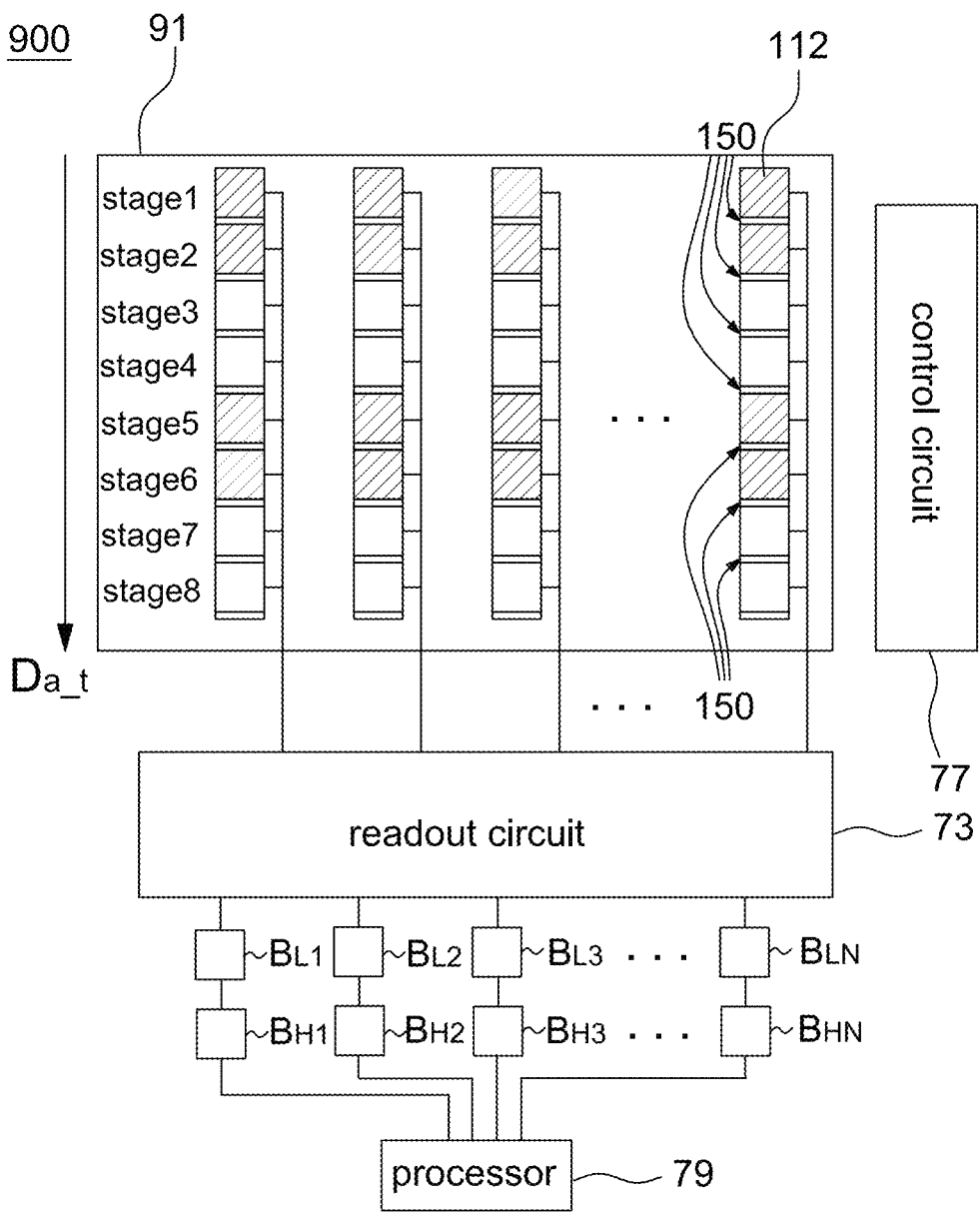

Please refer to FIG. 9, it is an alternative TDI CMOS image sensor 900 according to the third embodiment of the present disclosure. The difference between the TDI CMOS image sensors 900 and 700 is that the first pixels (e.g., stage1, stage2, stage5 and stage6) and the second pixels (e.g., stage3, stage4, stage7 and stage8) of the pixel array 91 are partially adjacent to each other in the along-track direction $D_{a\_t}$. Other parts of the TDI CMOS image sensor 900 are identical to the TDI CMOS image sensor 700, i.e. integrating pixel data of first pixels respectively using first integrators $B_{L1}$-$B_{LN}$, and integrating pixel data of second pixels respectively using second integrators $B_{H1}$-$B_{HN}$, or vice versa. And the processor 79 uses a first image frame generated by the first integrators $B_{L1}$-$B_{LN}$ and a second image frame generated by the second integrators $B_{H1}$-$B_{HN}$ to generate a combination image.

It should be mentioned that the arrangement of first pixels and second pixels in the pixel array is not limited to those shown in FIGS. 7 to 9 as long as each pixel column having identical numbers of the first pixels and the second pixels.

Figure 10:
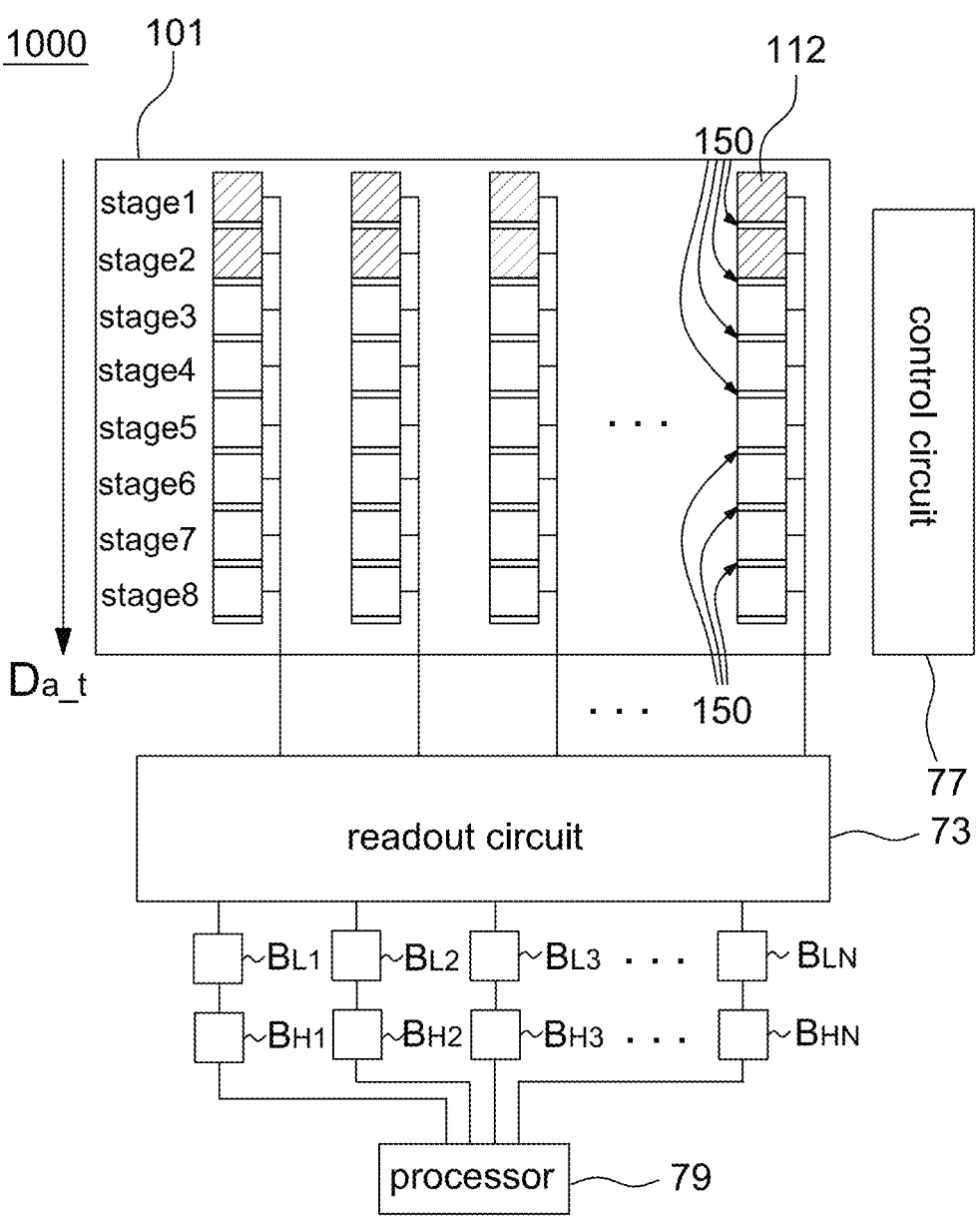
FIG. 10 is a schematic diagram of a TDI CMOS image sensor according to a fourth embodiment of the present disclosure.

Please refer to FIG. 10, it is a schematic diagram of a TDI CMOS image sensor 1000 according to a fourth embodiment of the present disclosure. The TDI CMOS image sensor 1000 also captures an image frame using a rolling shutter and moves with respect to a scene in an along-track direction $D_{a\_t}$.

The TDI CMOS image sensor 1000 also includes a pixel array 101, a readout circuit 73, a control circuit 77, multiple first integrators $B_{L1}$-$B_{LN}$, multiple second integrators $B_{H1}$-$B_{HN}$ and a processor 79, wherein elements identical to those of FIGS. 7 to 9 are indicated by identical reference numerals.

Operations of the readout circuit 73 and the control circuit 77 are similar to those of the above embodiments, and thus details thereof are not repeated herein.

The pixel array 101 also includes multiple pixel columns 112. Each of the pixel columns 112 includes multiple pixels (e.g., stage1 to stage8) arranged in the along-track direction $D_{a\_t}$, and two adjacent pixels of each of the pixel columns 112 have a separation space 150 therebetween.

In this embodiment, the multiple pixels of each pixel column 112 include a first number of (e.g., two) multiple first pixels (e.g., stage1 to stage2) and a second number (e.g., six) of, larger than the first number, multiple second pixels (e.g., stage3 to stage8).

The multiple first integrators $B_{L1}$-$B_{LN}$ are respectively coupled to the readout circuit 73, and each of the first integrators $B_{L1}$-$B_{LN}$ respectively integrates pixel data of the first pixels stage1 to stage2 of the corresponding pixel column 112. The multiple second integrators $B_{H1}$-$B_{HN}$ are respectively coupled to the readout circuit 73, and each of the second integrators $B_{H1}$-$B_{HN}$ respectively integrates pixel data of the second pixels stage3 to stage8 of the corresponding pixel column 112. As mentioned above, the first integrators $B_{L1}$-$B_{LN}$ and the second integrators $B_{H1}$-$B_{HN}$ coupled to the same pixel column 112 respectively integrate pixel data of a same position or object of a scene in adjacent image frames. For example, stage 1 to stage8 of the same pixel column 112 integrate pixel data of a same position or object of a scene.

The processor 79 then generates a combination image according to a first image frame generated by the first integrators $B_{L1}$-$B_{LN}$ and a second image frame generated by the second integrators $B_{H1}$-$B_{HN}$.

The processor 79 receives integrated pixel data from multiple first integrators $B_{L1}$-$B_{LN}$ and multiple second integrators $B_{H1}$-$B_{HN}$. Because a number of integration times of the integrated pixel data of the first integrators $B_{L1}$-$B_{LN}$ is less than a number of integration times of the integrated pixel data of the second integrators $B_{H1}$-$B_{HN}$, the processor 79 further amplifies the first pixel data using a ratio (second number/first number)=6/2 before combining images to cause the first pixel data to have a similar integrating effect to that of the second pixel data.

Next, the processor 79 generates a combination image using the ratio-amplified first image frame and the second image frame. In another aspect, if a number of times of integrating the first pixel data is larger than a number of times of integrating the second pixel data (i.e. a number of first pixels larger than a number of second pixels), the processor 79 amplifies the second pixel data using a ratio (first number/second number) or reduces the first pixel data using the ratio (first number/second number) to have similar effect of integration.

It is appreciated that a ratio between the first pixels and the second pixels in FIG. 10 is not limited to three times. A ratio of numbers of multiple first pixels and multiple second pixels in each pixel column 112 is selected according to different applications without particular limitations as long as pixel data is amplified by a ratio of pixel numbers.

In addition, although FIG. 10 shows that the first pixels stage1 to stage2 and the second pixels stage3 to stage8 are all adjacent to one another, the present disclosure is not limited thereto. In other aspects, the first pixels stage1 to stage2 and the second pixels stage3 to stage8 are interlaced or partially adjacent to each other similar to those shown in FIG. 8 and FIG. 9. Furthermore, the position arrangement of the first pixels and the second pixels in the pixel array 101 are not limited to that shown in FIG. 10.

Figure 1:
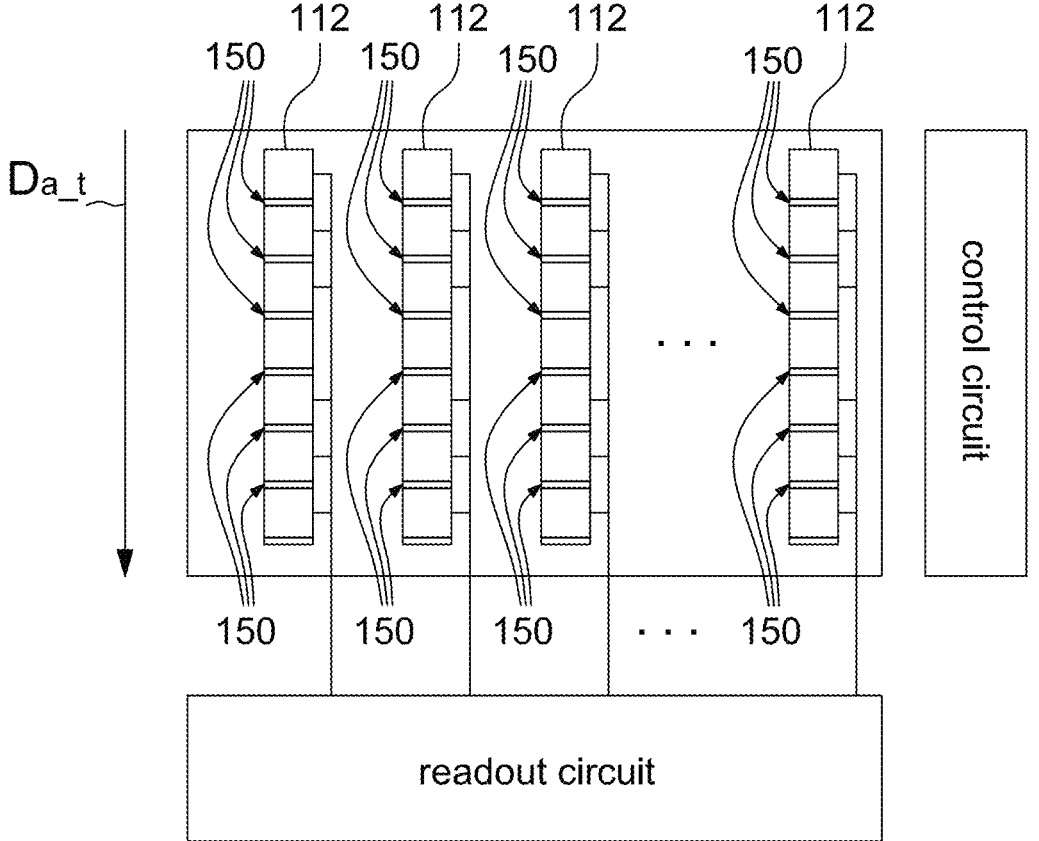
FIG. 1 is a schematic diagram of a CMOS image sensor for time delay integration (TDI) imaging.

It should be mentioned that although FIGS. 7 to 10 are illustrated using the pixel array in FIG. 1, i.e. the separation space being a multiplication of a pixel height in the along-track direction $D_{a\_t}$ with a time ratio of a line time difference of the rolling shutter and a frame period of capturing the image frame, the present disclosure is not limited thereto. Embodiments of FIGS. 7 to 10 are also adaptable to the pixel array 200 in FIG. 2, i.e. the separation space being a summation of a pixel height in the along-track direction $D_{a\_t}$ and a multiplication of the pixel height with a time ratio of a line time difference of the rolling shutter and a frame period of capturing the image frame as long as the TDI CMOS image sensors in FIGS. 7 to 10 include two groups of integrators to respectively integrate pixel data of multiple first pixels and multiple second pixels having different sensing ability.

As mentioned above, the line time difference is a time interval between time points of starting exposure of two adjacent pixel rows of a pixel array.

It is appreciated that values, e.g., including a number of pixels, integrators and image frames, in every embodiment and drawing of the present disclosure are only intended to illustrate but not to limit the present disclosure.

It should be mentioned that although FIGS. 7-10 show that pixel data to be integrated into the first integrators $B_{L1}$ to $B_{LN}$ and into the second integrators $B_{H1}$ to $B_{HN}$ are read by the same readout circuit 73, it is only intended to illustrate but not to limit the present disclosure. In another aspect, the pixel data to be integrated into the first integrators $B_{L1}$ to $B_{LN}$ is read by a first readout circuit, and the pixel data to be integrated into the second integrators $B_{H1}$ to $B_{HN}$ is read by a second readout circuit, different from the first readout circuit, similar to readout circuits 53 and 55 in FIG. 5.

As mentioned above, when the CMOS image sensor adopting rolling shutter technique is applied to TDI imaging, the integrated pixel data is not exactly corresponding to the same position or object in a scene to generate distortion because the exposure of all pixels of a pixel array is not started and ended at the same time. Accordingly, the present disclosure further provides a TDI CMOS image sensor using a rolling shutter (e.g., FIGS. 2 and 5) and an operating method thereof (e.g., FIGS. 3, 4A and 6) that compensate the line time difference of a rolling shutter, which causes distortion, by arranging different pixel separation spaces. By arranging the control signal of a control circuit correspondingly, pixel data of corresponding position is integrated to the associated integrator correctly. Furthermore, by arranging multiple pixel arrays along an along-track direction and aligning every pixel column of the multiple pixel arrays to be able to cross the same position or object of a scene sequentially, pixel data of the aligned pixel columns can be integrated.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A time delay integration (TDI) complementary metal-oxide-semiconductor (CMOS) image sensor, configured to capture an image frame using a rolling shutter and move with respect to a scene in an along-track direction, the image sensor comprising:
   a pixel array, comprising multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple first pixels and multiple second pixels, and the multiple first pixels are exposed by a first exposure time and the multiple second pixels are exposed by a second exposure time, different from the first exposure time;

multiple first integrators, respectively configured to integrate pixel data of the multiple first pixels; and
   multiple second integrators, respectively configured to integrate pixel data of the multiple second pixels,
   wherein the separation space is a multiplication of a pixel height in the along-track direction with a time ratio of a line time difference of the rolling shutter and a frame period of capturing the image frame, and the line time difference is a time interval between a time of starting exposure of two adjacent pixel rows.

2. The image sensor as claimed in claim 1, wherein the multiple first pixels of each of the pixel columns are all adjacent to one another, and the multiple second pixels of each of the pixel columns are all adjacent to one another.

3. The image sensor as claimed in claim 1, wherein a part of the multiple first pixels of each of the pixel columns are adjacent to one another, and a part of the multiple second pixels of each of the pixel columns are adjacent to one another.

4. The image sensor as claimed in claim 1, wherein the multiple first pixels and the multiple second pixels of each of the pixel columns are interlaced.

5. The image sensor as claimed in claim 1, wherein the multiple first integrators and the multiple second integrators corresponding to a same pixel column respectively configured to integrate pixel data of a same position of the scene in adjacent image frames.

6. A time delay integration (TDI) complementary metal-oxide-semiconductor (CMOS) image sensor, configured to capture an image frame using a rolling shutter and move with respect to a scene in an along-track direction, the image sensor comprising:
   a pixel array, comprising multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple first pixels and multiple second pixels, and the multiple first pixels have a first quantum efficiency and the multiple second pixels have a second quantum efficiency, different from the first quantum efficiency;
   multiple first integrators, respectively configured to integrate pixel data of the multiple first pixels; and
   multiple second integrators, respectively configured to integrate pixel data of the multiple second pixels,
   wherein the separation space is a multiplication of a pixel height in the along-track direction with a time ratio of a line time difference of the rolling shutter and a frame period of capturing the image frame, and the line time difference is a time interval between a time of starting exposure of two adjacent pixel rows.

7. The image sensor as claimed in claim 6, wherein the multiple first pixels of each of the pixel columns are all adjacent to one another, and the multiple second pixels of each of the pixel columns are all adjacent to one another.

8. The image sensor as claimed in claim 6, wherein a part of the multiple first pixels of each of the pixel columns are adjacent to one another, and a part of the multiple second pixels of each of the pixel columns are adjacent to one another.

9. The image sensor as claimed in claim 6, wherein the multiple first pixels and the multiple second pixels of each of the pixel columns are interlaced.

10. The image sensor as claimed in claim 6, wherein the multiple first integrators and the multiple second integrators corresponding to a same pixel column respectively configured to integrate pixel data of a same position of the scene in adjacent image frames.

11. The image sensor as claimed in claim 6, wherein each of the multiple first pixels is aligned with a center of a convex microlens, is covered by a filter having a first transparency or has a first fill factor to form the first quantum efficiency, and each of the multiple second pixels is aligned with edges of two adjacent convex microlens, is covered by a filter having a second transparency, different from the first transparency, or has a second fill factor, different from the first fill factor, to form the first second efficiency.

12. A time delay integration (TDI) complementary metal-oxide-semiconductor (CMOS) image sensor, configured to capture an image frame using a rolling shutter and move with respect to a scene in an along-track direction, the image sensor comprising:

a pixel array, comprising multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple first pixels and multiple second pixels, the multiple first pixels are exposed by a first exposure time and have a first quantum efficiency, and the multiple second pixels are exposed by a second exposure time, different from the first exposure time and have a second quantum efficiency, different from the first quantum efficiency;

multiple first integrators, respectively configured to integrate pixel data of the multiple first pixels; and multiple second integrators, respectively configured to integrate pixel data of the multiple second pixels, wherein the separation space is a multiplication of a pixel height in the along-track direction with a time ratio of a line time difference of the rolling shutter and a frame period of capturing the image frame, and the line time difference is a time interval between a time of starting exposure of two adjacent pixel rows.

13. The image sensor as claimed in claim 12, wherein the multiple first pixels of each of the pixel columns are all adjacent to one another, and the multiple second pixels of each of the pixel columns are all adjacent to one another.

14. The image sensor as claimed in claim 12, wherein a part of the multiple first pixels of each of the pixel columns are adjacent to one another, and a part of the multiple second pixels of each of the pixel columns are adjacent to one another.

15. The image sensor as claimed in claim 12, wherein the multiple first pixels and the multiple second pixels of each of the pixel columns are interlaced.

16. The image sensor as claimed in claim 12, wherein each of the multiple first pixels is aligned with a center of a convex microlens, is covered by a filter having a first transparency or has a first fill factor to form the first quantum efficiency, and each of the multiple second pixels is aligned with edges of two adjacent convex microlens, is covered by a filter having a second transparency, different from the first transparency, or has a second fill factor, different from the first fill factor, to form the first second efficiency.

* * * * *